US012500775B2

(12) United States Patent
Abene et al.

(10) Patent No.: US 12,500,775 B2
(45) Date of Patent: Dec. 16, 2025

(54) MANAGING COMMUNICATIONS BETWEEN A VEHICLE AND A USER DEVICE

(71) Applicant: RIVIAN IP HOLDINGS, LLC, Plymouth, MI (US)

(72) Inventors: Mark Thomas Abene, San Jose, CA (US); David A. Fung, Cupertino, CA (US); Akash Sridhara Acharya, San Jose, CA (US); Leonid Kokhnovych, Burnaby (CA)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 82 days.

(21) Appl. No.: 17/886,324

(22) Filed: Aug. 11, 2022

(65) Prior Publication Data

US 2023/0071702 A1 Mar. 9, 2023

Related U.S. Application Data

(60) Provisional application No. 63/240,425, filed on Sep. 3, 2021.

(51) Int. Cl.
*H04L 9/32* (2006.01)
*H04L 9/08* (2006.01)
*H04L 9/30* (2006.01)

(52) U.S. Cl.
CPC .......... *H04L 9/3242* (2013.01); *H04L 9/0819* (2013.01); *H04L 9/3006* (2013.01)

(58) Field of Classification Search
CPC .... H04L 9/3242; H04L 9/0819; H04L 9/3006
See application file for complete search history.

(56) References Cited

U.S. PATENT DOCUMENTS

2014/0064488 A1* 3/2014 Ho .................. H04W 12/50
380/270
2014/0079217 A1* 3/2014 Bai ................. H04L 9/3271
380/270

(Continued)

FOREIGN PATENT DOCUMENTS

CN 103686713 A 3/2014

OTHER PUBLICATIONS

"BMW Connected Drive Get Started Guide. BMW Digital Key", BMW of North America, LLC. May 19, 2021, 13 pages.

(Continued)

*Primary Examiner* — Techane Gergiso
(74) *Attorney, Agent, or Firm* — Haley Guiliano LLP

(57) ABSTRACT

Systems and methods are provided to communicate, by a server, with a vehicle over a second communication path, where the vehicle is configured to communicate with a user device over a first communication path. The server may associate a user device with an authenticated user profile that is associated with the vehicle. The server may identify a public-private key pair associated with the user device and a public-private key pair associated with the vehicle. Processing circuitry may generate a shared key based on the public-private key pair associated with the user device and the public-private key pair associated with the vehicle, and the processing circuitry may establish a communication channel between the user device and the vehicle over the first communication path using the shared key.

19 Claims, 7 Drawing Sheets

(56) References Cited

U.S. PATENT DOCUMENTS

| | | | | |
|---|---|---|---|---|
| 2014/0169564 | A1* | 6/2014 | Gautama | G07C 9/00309 |
| | | | | 380/270 |
| 2014/0270172 | A1* | 9/2014 | Peirce | H04L 9/0819 |
| | | | | 380/270 |
| 2015/0148989 | A1* | 5/2015 | Cooper | E05F 15/77 |
| | | | | 701/2 |
| 2016/0012653 | A1* | 1/2016 | Soroko | G07C 5/008 |
| | | | | 340/5.61 |
| 2017/0285634 | A1* | 10/2017 | Chin | G08C 17/02 |
| 2017/0352215 | A1* | 12/2017 | Maiwand | G07C 9/00309 |
| 2018/0006810 | A1* | 1/2018 | Ideguchi | H04L 9/3263 |
| 2018/0198763 | A1* | 7/2018 | Bryson | H04L 63/0428 |
| 2018/0287787 | A1* | 10/2018 | Tschache | H04L 9/3242 |
| 2018/0326947 | A1* | 11/2018 | Oesterling | B60R 25/241 |
| 2018/0351941 | A1* | 12/2018 | Chhabra | H04L 63/08 |
| 2020/0100108 | A1* | 3/2020 | Everson | H04L 63/12 |
| 2020/0313890 | A1* | 10/2020 | Mondello | H04L 9/3239 |
| 2021/0064778 | A1* | 3/2021 | Vladimerou | H04L 9/0866 |
| 2021/0288801 | A1* | 9/2021 | Kulkarni | H04L 9/0631 |
| 2022/0191700 | A1* | 6/2022 | Jung | H04L 9/3242 |
| 2024/0116475 | A1* | 4/2024 | Ying | H04L 9/0825 |

OTHER PUBLICATIONS

Hawley, D., "How to Program a Car Key Chip", J. D. Power, Retrieved from: https://www.jdpower.com/cars/shopping-guides/how-to-program-a-car-key-chip, Feb. 10, 2021, 12 pages.

* cited by examiner

| | |
|---|---|
| Device Table | |
| Username | John123 |
| Public Key of User Device | 3235432135411234567890987654323454532 |
| User Device ID | 0000900D-0000-1000-8000-00805F9B34FB |
| Vehicle ID | 0000300D-0000-1000-8000-00805F9B34FB |
| Enrolled | Yes |
| Token Index | 1000 |
| Flags | New Google Phone 6 |
| HMAC Key | 9874321123456788654224636498790235678 |

FIG. 4

MANAGING COMMUNICATIONS BETWEEN A VEHICLE AND A USER DEVICE

CROSS-REFERENCE TO RELATED APPLICATION

This application claims the benefit of U.S. Provisional Application No. 63/240,425 filed Sep. 3, 2021, the disclosure of which is hereby incorporated by reference herein in its entirety.

INTRODUCTION

Many vehicles are configured to enable a user to wirelessly perform a function (e.g., lock and unlock doors of the vehicle, pair a device to media system of a vehicle) with a key fob or mobile device. For example, a user's smartphone may provide an option to pair the smartphone with the vehicle over a Bluetooth® connection. However, vehicles generally allow any user with a smartphone to pair to the vehicle, even if the user is not the vehicle owner and is not authorized to do so by the vehicle owner.

SUMMARY

Accordingly, systems and methods are disclosed herein comprising: a vehicle configured to communicate with a user device over a first communication path; a server configured to: communicate with the vehicle over a second communication path; associate the user device with an authenticated user profile that is associated with the vehicle; identify a public-private key pair associated with the user device; and identify a public-private key pair associated with the vehicle; and processing circuitry configured to: generate a shared key based on the public-private key pair associated with the user device and the public-private key pair associated with the vehicle; and establish a communication channel between the user device and the vehicle over the first communication path using the shared key.

In some embodiments, the processing circuitry is configured to establish the communication channel between the user device and the vehicle over the first communication path using the shared key by: generating an authentication code based on the shared key and a hash function; and authenticating a message received over the communication channel using the authentication code.

In some embodiments, the server is configured to identify the public-private key pair associated with the vehicle by receiving a public key of the public-private key pair associated with the vehicle from the vehicle, wherein the public-private key pair associated with the vehicle is generated at the vehicle; and the processing circuitry is configured to generate the shared key based on the public-private key pair associated with the user device and the public-private key pair associated with the vehicle by: receiving, at the vehicle from the server, a public key of the public-private key pair associated with the user device; and generating, at the vehicle, the shared key based on the received public key of the public-private key pair associated with the user device and based on a private key of the public-private key pair associated with the vehicle.

In some embodiments, the processing circuitry is further configured to broadcast a vehicle identifier, and the vehicle identifier is used to initiate a connection between the user device and the vehicle over the first communication path.

In some embodiments, the processing circuitry is further configured to: generate an authentication code based on the shared key, a hash function, and the vehicle identifier; and establish the communication channel between the user device and the vehicle over the first communication path using the shared key by authenticating a message received over the communication channel using the authentication code.

In some embodiments, the server is further configured to generate a user device identifier based on a public key of the public-private key pair associated with the user device; and the processing circuitry is further configured to: generate an authentication code based on the shared key, a hash function and the user device identifier; and establish the communication channel between the user device and the vehicle over the first communication path using the shared key by authenticating a message received over the communication channel using the authentication code.

In some embodiments, the server is configured to identify the public-private key pair associated with the user device by receiving a public key associated with the user device, and the public key associated with the user device is included in the public-private key pair associated with the user device.

In some embodiments, the shared key is used to authenticate messages between the user device and the vehicle over the first communication path.

In some embodiments, the first communication path is over a Bluetooth Low Energy (BLE) connection and the second communication path is over the Internet; and the user device is a key fob or a mobile device.

In some embodiments, the server is further configured to generate data associated with the authenticated user profile, wherein the data comprises a user device identifier, and a username associated with the authenticated user profile, and transmit the data to the vehicle. The processing circuitry may be further configured to initiate a connection between the user device and the vehicle over the first communication path based on the data. In some embodiments, the generated data may be stored and/or transmitted in the form of a device table comprising a plurality of entries, or the generated data may be stored and/or transmitted in any other suitable form, e.g., the values of the user device identifier and the username may be transmitted in a bitstream.

In addition, A vehicle configured to communicate with a user device over a first communication path, the vehicle comprising memory, and processing circuitry configured to receive an indication, from a server over a second communication path, that a user device is associated with an authenticated user profile that is associated with the vehicle; receive, over the second communication path, a public key of a public-private key pair associated with the user device; identify a public-private key pair associated with the vehicle; store in the memory the public-private key pair associated with the vehicle; generate a shared key based on the public key associated with the user device and the public-private key pair associated with the vehicle; and establish a communication channel between the user device and the vehicle over the first communication path using the shared key.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 shows an illustrative device table, in accordance with some embodiments of the present disclosure;

DETAILED DESCRIPTION

Figure 1:
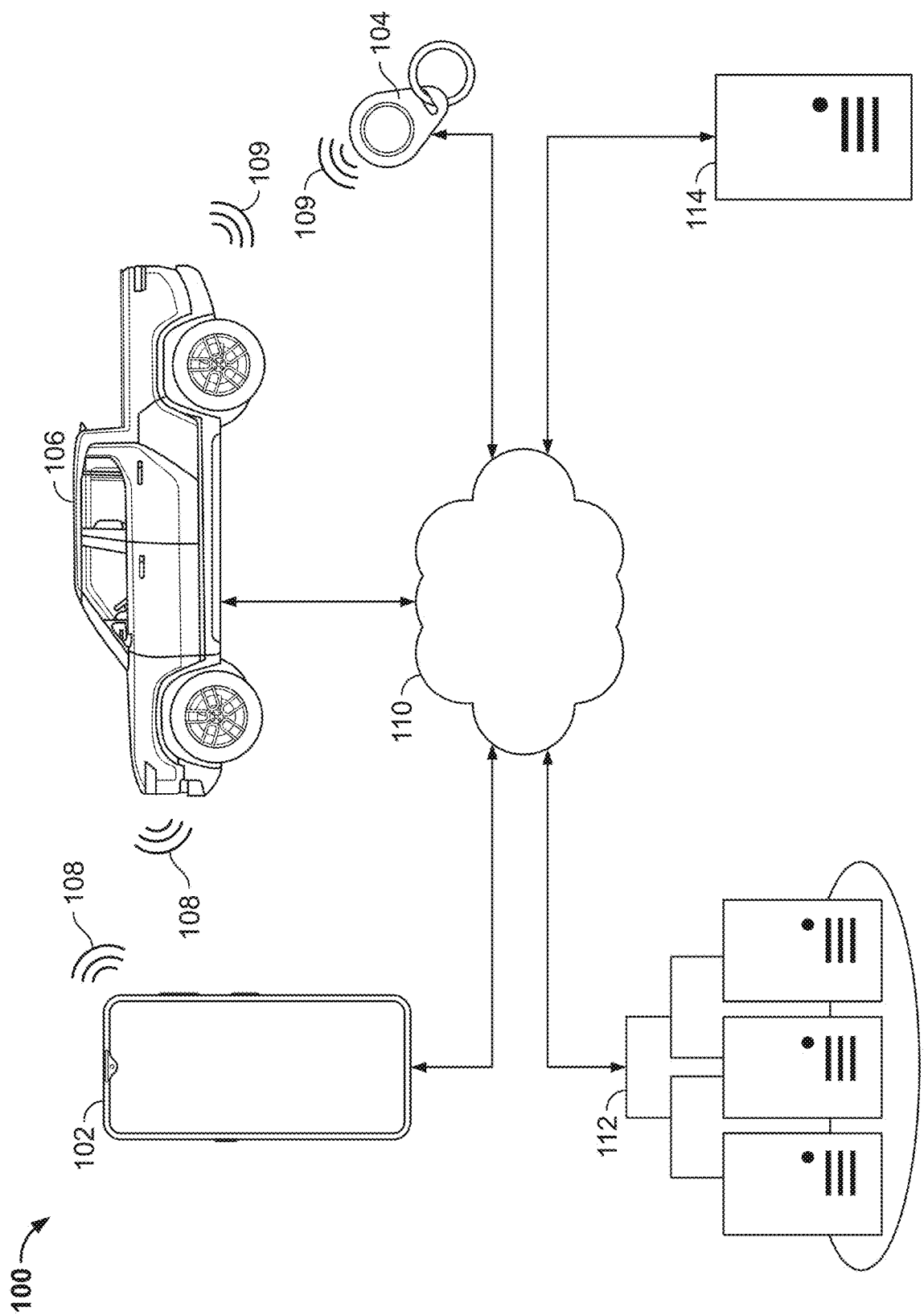
FIG. 1 shows a block diagram of components of a system configured to establish a communication channel between a user device and a vehicle over a first communication path using a shared key, in accordance with some embodiments of the present disclosure.

FIG. 1 shows a block diagram of components of a system 100 configured to establish a communication channel between user device 102 and/or 104 and vehicle 106 over a first communication path using a shared key, in accordance with some embodiments of the present disclosure. System 100 may comprise vehicle 106, one or more of user device 102 (e.g., a mobile device, such as, for example, a smart phone or a tablet) and user device 104 (e.g., a key fob), cloud computing resources 112 (e.g., one or more servers, which may include or be in communication with one or more databases), and key management server 114. Such elements of system 100 may be configured to communicate over a first communication path and/or a second communication path. The first communication path may be associated with, e.g., a short-range radio communication technique, such as, for example, Bluetooth low energy (BLE) 108 or near-field communication (NFC) 109, and the second communication path may be associated with network 110, e.g., the Internet, a local area network, a wide area network, a satellite network, etc. System 100 may employ cryptographic techniques (e.g., generation of public-private keys and shared keys or secrets by user device 102, 104 and vehicle 106 and/or server 112 and/or server 114). Server 112 may be utilized as a trusted intermediary to exchange certain keys (e.g., non-private information such as, for example, public keys) between user device 102 or 104 and vehicle 106. As discussed in more detail below, such cryptographic techniques may be utilized to establish a communication channel between user device 102 or 104 and vehicle 106 over a first communication path (e.g., BLE path 108). User device 102 and/or 104 may be operable by a user to perform various functions in connection with vehicle 106 (e.g., unlocking and locking doors or hatches, pairing to a media system of vehicle 106, starting or turning of vehicle 106, signaling a panic condition, etc.) over the first communication path.

Figure 2:
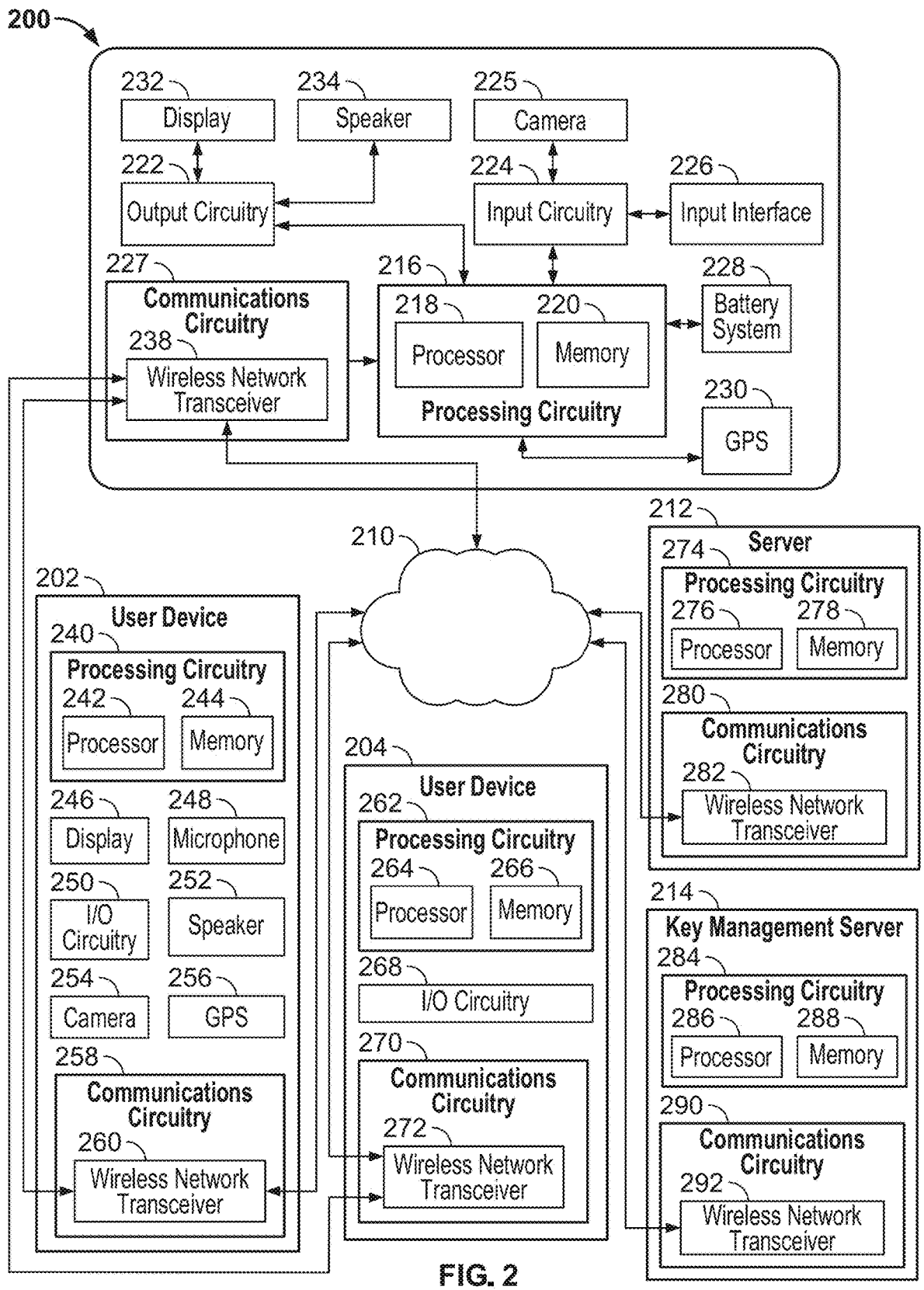
FIG. 2 shows a block diagram of components of a system configured to establish a communication channel between a user device and a vehicle over a first communication path using a shared key, in accordance with some embodiments of the present disclosure.

FIG. 2 shows a block diagram of components of a system 200 configured to establish a communication channel between a user device 202 and vehicle 206 over a first communication path using a shared key, in accordance with some embodiments of the present disclosure. Vehicle 206 may correspond to vehicle 106 of FIG. 1, and user device 202 may correspond to user device 102 (e.g., a mobile device, such as, for example, a smartphone) or user device 204 (e.g., such as, for example, a key fob).

Vehicle 206 may be a car (e.g., a coupe, a sedan, a truck, an SUV, a bus), a motorcycle, an aircraft (e.g., a drone), a watercraft (e.g., a boat), or any other type of vehicle. Vehicle 206 may comprise processing circuitry 216 which may comprise processor 218 and memory 220. Processor 218 may comprise a hardware processor, a software processor (e.g., a processor emulated using a virtual machine), or any combination thereof. In some embodiments, processor 218 and memory 220 in combination may be referred to as processing circuitry 216 of vehicle 206. In some embodiments, processor 218 alone may be referred to as processing circuitry 216 of vehicle 206. Memory 220 may comprise hardware elements for non-transitory storage of commands or instructions, that, when executed by processor 218, cause processor 218 to operate vehicle 206 in accordance with embodiments described above and below. Processing circuitry 216 may be communicatively connected to components of vehicle 206 via one or more wires, or via wireless connection.

Processing circuitry 216 may be communicatively connected to input interface 226 (e.g., a steering wheel, a touch screen display, buttons, knobs, a microphone or other audio capture device, etc.) via input circuitry 224. In some embodiments, a driver of vehicle 206 may be permitted to select certain settings in connection with the operation of vehicle 206 via input interface 226, and/or input interface 226 may be configured to receive selection (e.g., via haptic input or voice input) of an option to pair user device 202 or user device 204 with vehicle 206. Input interface 226 may be communicatively connected to one or more cameras 225, which may be configured to capture an internal or external environment of vehicle 206. Such images may be transmitted to processing circuitry 216 and used to, e.g., detect obstacles or vehicles in a vicinity of vehicle 206, for facial recognition purposes to authenticate a driver of vehicle 206, etc.

Processing circuitry 216 may be communicatively connected to display 232 and speaker 234 by way of output circuitry 222. Display 232 may be located at a dashboard of vehicle 206 and/or at a heads-up display at a windshield of vehicle 206. Display 232 may comprise an LCD display, an OLED display, an LED display, or any other type of display. Speaker 234 may be located at any location within the cabin of vehicle 206, e.g., at the dashboard of vehicle 206, on an interior portion of the vehicle door, etc., and may be configured to provide audio output to a driver of vehicle 206.

Processing circuitry 216 may be communicatively connected to communications circuitry 227. Communications circuitry 227 may comprise wireless network transceiver 238 which may comprise any suitable hardware and/or software operable to send and receive wireless signals between vehicle 206 and external devices such as, for example, network or user devices (e.g., user device 202, user device 204, server 212, server 214 and/or a Wi-Fi access point and/or a satellite) and/or any other suitable computing devices. Wireless network transceiver 238 may include an antenna and other control circuitry (e.g., protocol converters, rate converters, signal converters), or any combination thereof. Wireless network transceiver 238 may comprise one or more components to facilitate communication over any suitable network or communication method (e.g., the Internet, short-range radio communication such as, for example, Bluetooth, BLE, NFC, etc.). For example, wireless network transceiver 238 may be configured to access the Internet, a local area network, a wide area network, a Bluetooth-enabled device, an NFC-enabled device, any other suitable device using any suitable protocol, or any combination thereof. In some embodiments, wireless network transceiver 238 may comprise a sensor configured to advertise a vehicle identifier (e.g., over a BLE link).

Processing circuitry 216 may be communicatively connected to battery system 228, which may be configured to provide power to one or more of the components of vehicle 206 during operation. In some embodiments, vehicle 206 may be an electric vehicle or a hybrid electric vehicle. Processing circuitry 216 may be communicatively connected to GPS system 230 or other positioning device of vehicle 206, where the driver may interact with GPS system 230 via input interface 226. GPS system 230 may be in communication with (e.g., via communications circuitry 227) one or more satellites and/or servers remote from vehicle 206 to ascertain a location of vehicle 206 and provide navigation directions to processing circuitry 216. As another example, the positioning device operate may operate on terrestrial signals, such as cell phone signals, Wi-Fi signals, or ultra-wideband signals to determine a location of vehicle 206. The determined location may be in any suitable form such as a geographic coordinate, a street address, a nearby landmark such as an identification of the nearest charging station or a tagged location associated with vehicle 206 (e.g., a location of a home of the user stored in memory 220).

It should be appreciated that FIG. 2 only shows some of the components of vehicle 206, and it will be understood that vehicle 206 also includes other elements commonly found in vehicles (e.g., electric vehicles), e.g., a motor, brakes, wheels, wheel controls, turn signals, windows, doors, etc.

User device 202 may be, for example, a smartphone, tablet or any suitable personal computing device operable to communicate with vehicle 206, user device 204, server 212 and/or key management server 214, e.g., by way of wireless network transceiver 260. In some embodiments, user device 202 may be configured to communicate with vehicle 206 by way of a wired connection (e.g., USB connection or other data cable).

User device 202 may comprise processing circuitry 240, processor 242, memory 244, which may be implemented in a similar manner as processing circuitry 216, processor 218 and memory 220, respectively. User device 202 may further comprise display 246, microphone 248, input/output (I/O) circuitry 250, speaker 252, camera 254 and GPS system 256, which may be implemented similarly to display 232, input interface 226, speaker 234, output circuitry 222 and input circuitry 224, speaker 234, camera 225 and GPS system 230. Communications circuitry 258 may be implemented in a similar manner as communications circuitry 227 of vehicle 206. Communications circuitry 258 may comprise wireless network transceiver 260 which may comprise one or more components configured to receive and transmit signals using various communication techniques. For example, wireless network transceiver 260 may enable user device 202 to communicate with vehicle 206 over a first communication path (e.g., BLE, NFC or other short-range communication technique) and wireless network transceiver 260 may enable user device 202 to communicate with server 212 and/or key management server 214 over a second communication path (e.g., network 210, such as, for example, the Internet, a satellite network, etc.).

User device 204 may be, e.g., a key fob. User device 204 may comprise processing circuitry 262, processor 264, memory 266, I/O circuitry 268, communications circuitry 270 and wireless network transceiver 272. Key fob 204 may comprise one or more buttons or other features for receiving haptic input from a user. For example, in some embodiments, key fob 204 comprises a number of buttons (e.g., two, three, four, or more than four buttons) that respectively correspond to a function or command. Key fob 204 may include a battery to provide electrical power, an antenna for transmitting and receiving signals, and processing circuitry 262 may convert user selections (e.g., presses of a button) to an electrical signal which may then be converted to a wireless signal (e.g., via the antenna). Wireless network transceiver 272 may be configured to enable user device 204 to communicate with vehicle 206 over a first communication path (e.g., BLE, NFC or other short-range communication technique) and wireless network transceiver 272 may enable user device 202 to communicate with server 212 and/or key management server 214 over a second communication path (e.g., network 210, such as, for example, the Internet, a satellite network, etc.).

Server 212 may comprise a plurality of servers configured to remotely provide cloud computing resources (e.g., storage, processing, software applications, etc.) to other components of system 200, e.g., user device 202, user device 204 and/or vehicle 206. In some embodiments, server 212 may be associated with a manufacturer of vehicle 206, and may be configured to store (e.g., a cloud-based storage system such as in memory 278 or a database associated with server 212) information related to each vehicle sold by the manufacturer and related to an owner of each vehicle, e.g., login credentials associated with a user profile of the vehicle owner with the manufacturer, which may be generated for and provided to the user upon his or her purchase of vehicle 206. Such information may be stored in any suitable format such as, for example, a database, a lookup table, a set of flags, one or more ASCII characters or words (e.g., in a text file), any other format, or any combination thereof.

In some embodiments, upon receiving, via wireless network transceiver 282 configured to receive signals from network 210 and which may be included in communications circuitry 280, login credentials from user device 202 (e.g., during an initial login process), processing circuitry 274 of server 212 may compare the received credentials to stored credentials for a plurality of vehicle owners in determining whether to authenticate the user. In response to authenticating the user credentials, processing circuitry 274 of server 212 may initiate an enrollment process of user device 202 in association with vehicle 206. For example, after authenticating the user profile based on login credentials received from user device 204, processing circuitry 274 of server 212 may generate a user device identifier for vehicle 206, for use in pairing user device 202 and vehicle 206. In some embodiments, processing circuitry 262 may be configured to generate and/or exchange one or more cryptographic digital keys (e.g., public-private keys for vehicle 206 or user device 202 or user device 204 and/or shared secret keys) to user device 202, user device 204, server 212 and/or vehicle 206.

Key management server 214 may comprise processing circuitry 284, processor 286, memory 288 and communications circuitry 290 comprising wireless network transceiver 292. In some embodiments, key management server 214 may generate an identifier for user device 204 and/or user device 202. In some embodiments, key management server 214 may be configured to generate one or more cryptographic digital keys (e.g., public-private keys for vehicle 206 or user device 202 or user device 204 and/or shared secret keys) and may be configured to transmit one or more of such keys to user device 202, user device 204, server 212 and/or vehicle 206.

Figure 3:
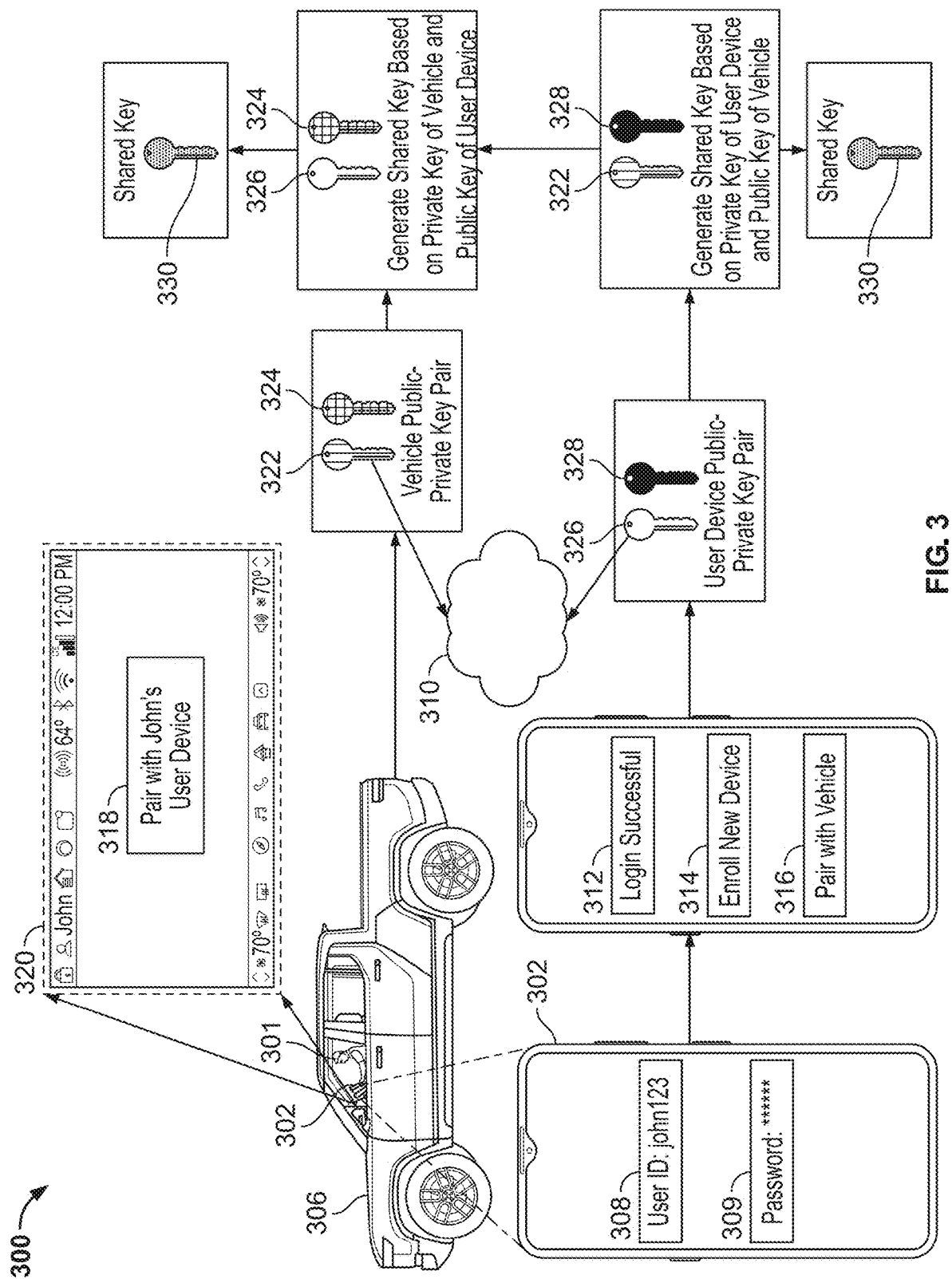
FIG. 3 shows a block diagram a system for generating a shared key, in accordance with some embodiments of the present disclosure.

FIG. 3 shows a block diagram of a system 300 for generating a shared key 330, in accordance with some embodiments of the present disclosure. System 300 depicts user 301 inside vehicle 306. Processing circuitry 240 of user device 202 may receive input of login credentials including user ID 308 and password 309, which may be input by user 301 by way of I/O circuitry 250. In some embodiments, login credentials may be received via input interface 226 of vehicle 206. In some embodiments, a manufacturer of vehicle 306 may provide instructions, e.g., by server 212 transmitting a message to an email address of user 301, to enable user 301 to create a user account associated with login credentials 308, 309.

Server 212, upon receiving the login credentials 308, 309 from wireless network transceiver 260 of user device 302 (e.g., over network 310 which may correspond to network 210), may determine whether the login credentials 308, 309 associated with user 301 are associated with an authenticated user profile. For example, processing circuitry 274 of server 212 may compare the received login credentials 308, 309 to stored credentials stored in memory 278 of server 212 or other cloud storage, and determine based on the comparison whether the credentials match a stored entry. In response to authenticating the user, server 212 may transmit an indication via wireless network transceiver 282 to user device 302 indicating the login was successful. Based on the received indication, user device 302 may generate for presentation at display 246 an indication 312 the login was successful, an option 314 to enroll new user device 302, and an option to pair with vehicle 306.

User device 302 may receive selection of option 314 to begin the enrollment of user device 302 in association with vehicle 306, and/or selection of option 316 to pair user device 302 with vehicle 306. In some embodiments, enrollment and/or pairing of vehicle 306 with user device 302 may be performed automatically in response to server 212 determining that the user profile associated with the validated login credentials is authenticated. In some embodiments, display 320 (which may correspond to display 232 of FIG. 2) of vehicle 306 may be caused (e.g., by processing circuitry 216 and/or output circuitry 222) to generate for presentation selectable option 318 to begin pairing and/or enrolling of user device 302 with vehicle 206. In some embodiments, a vehicle identifier (e.g., generated during the manufacturing of vehicle 306 and transmitted to server 212) may be advertised or broadcast by vehicle 306 by way of a first communication path (e.g., a BLE link), and discoverable by user device 302, to initiate a connection between user device 302 and vehicle 306.

In some embodiments, vehicle roles may be assigned, e.g., by server 212, to an owner of vehicle 206. For example, server 212 may assign a primary owner role to the user profile and/or user device having been authenticated by server 212. In some embodiments, a mobile application (e.g., running at least in part on user device 102 and/or server 112 or otherwise provided to user device 102 by server 112) may be provided which enables a user of user device 102 to manage access to vehicle 106 with respect to other users (e.g., spouses or children of the owner user). For example, even if such other user does not have a registered account with server 112, the designated owner user may invite the other user to set up an account and grant access to vehicle 106 to a device and/or profile associated with such other user.

Each of user device 302 and vehicle 306 may generate respective digital public-private key pairs for use in securing access of user 301 to features of vehicle 306. In some embodiments, at least a portion of the generated public-private key pairs may be generated by server 212 and/or key management server 214. For example, user device 302 may generate public key 326 and private key 328 of a public-private key pair associated with user device 302, and vehicle 306 may generate public key 322 and private key 324 of a public-private key pair associated with vehicle 306. For example, each public-private key pair may be generated using any suitable cryptographic algorithm or technique (e.g., RSA, ECC, ECDSA asymmetric algorithms).

In some embodiments, the public key and the private key may comprise respective strings of numeric characters or alphanumeric characters. In some embodiments, a message that is encrypted with public key 326 of user device 302 can only be decrypted with private key 328 of user device 302, and a message that is encrypted with public key 322 of vehicle 306 can only be decrypted with private key 328 of vehicle 306. Server 212 may receive, by way of network 310, public key 322 of vehicle 306 at any suitable time (e.g., during manufacturing) and may receive public key 326 of user device 302 at any suitable time (e.g., once user device 302 generates public key 326, such as, for example, after receiving an indication that user device 302 has successfully logged into the user profile associated with user device 302 and user 301). In some embodiments, user device 302 may transmit public key 326 to server 212 via an API request, which may comprise a request to enroll user device 302 in association with a specific vehicle (e.g., vehicle 306). In some embodiments, private key 324 and/or public key 322 of vehicle 306 may be stored and/or embedded in processing circuitry 216 during manufacturing of vehicle 306.

In some embodiments, the public-private key pairs and shared key 330 may be generated using the Elliptic-curve Diffie-Hellman (ECDH) key exchange protocol, which leverages the difficulty of solving an elliptic curve discrete logarithm problem. To generate shared key 330, the ECDH protocol utilizes parameter values of an elliptic curve that are established by user device 302 and vehicle 306. Each of user device 302 and vehicle 306 may include processing circuitry (e.g., processing circuitry 240 and processing circuitry 216, respectively, of FIG. 2) that includes or implements the ECDH key exchange protocol and which may be used to generate the shared key. For instance, each of device 302 and vehicle 306 may generate respective private keys and compute respective points on the elliptic curve based on its generated private key and a parameter value G, a generator point, of the elliptic curve. The computed points on the elliptic curve may correspond to respective public keys of user device 302 and vehicle 306, and may be exchanged between vehicle 306 and user device 302 by way of server 212 over network 310. For example, user device 302 computes point UD on the elliptic curve of $(X_{UD}, Y_{UD})$, and vehicle 306 computes point V on the elliptic curve of $(X_V, Y_V)$, where point UD is transmitted to vehicle 306 by way of server 212 and point V is transmitted to user device 302 by way of server 212 over network 210. Based on the above, shared key 330 may be determined to be the same value by each of vehicle 306 and user device 302, and may be known only to vehicle 306 and user device 302. For example, shared key 330 may be computed by user device 302 based on (e.g., by multiplying) private key 328 of user device 302 with public key 322 (e.g., point V on the elliptic curve) of vehicle 306, and shared key 330 may be computed by vehicle 306 based on (e.g., by multiplying) private key 324 of vehicle 306 with public key 326 (e.g., point UD on the elliptic curve) of user device 302. For example, the shared secret may correspond to an x-coordinate of the result of such computations. In some embodiments, at least a portion of the performing the ECDH key exchange protocol to generate the shared key may be implemented by processing circuitry 274 of server 212.

Once shared key 330 is obtained, shared key 330 may be employed along with a cryptographic hash function (e.g., SHA-256, SHA-512, MD5, SHA-1) to generate a hash-based message authentication code (HMAC) for use in performing an authentication sequence between vehicle 306 and user device 302. The cryptographic hash function may be understood as a function that accepts an arbitrary length string and outputs a hash or fingerprint of fixed length string of characters (e.g., numeric or alphanumeric) and which is deterministic, e.g., the same output is yielded for the same repeated input. Shared key 330 may correspond to a HMAC key, which may be to generate a HMAC code or tag, e.g., by hashing the HMAC key with the message to be sent. In some embodiments, the HMAC key may be used to derive two keys used for multiple hashing passes to generate the HMAC code or tag. For example, the message to be sent may be hashed with the first of the derived keys to obtain a first result, and such first result may be hashed with the second derived key to obtain the HMAC code. In some embodiments, the computation of HMAC code or tag may additionally be based on one or more of an identifier (e.g., a UUID) of user device 302, vehicle 306, and/or session and/or message identifiers which may be randomly generated. The HMAC code may be transmitted (e.g., over a BLE link) by vehicle 306 or user device 302, to the other of vehicle 306 or user device 302, along with the message to be sent. In some embodiments, the HMAC function may be applied to the plaintext message, prior to encryption (e.g., wrapping by AES), or the plaintext message may be encrypted (e.g., by AES) and the HMAC function may be applied to the encrypted message.

The entity receiving the message (e.g., user device 302 or vehicle 306) may perform an authentication or verifying function on the received message and the received HMAC code or tag, using the HMAC key (e.g., shared key 330), to authenticate and ensure integrity of the message. For example, the user device 302 or vehicle 306 may, using the HMAC key and the cryptographic hashing function, compute the HMAC code associated with the received message and determine whether the received HMAC code matches the computed HMAC code. If the receiving entity determines there is a match, user device 302 may be permitted to establish a communication channel with vehicle 306 to transmit instructions (e.g., to perform certain functions of vehicle 306, such as, for example, locking or unlocking doors, starting or stopping vehicle 306, controlling a media system of vehicle 306 over a BLE link) to vehicle 306. In some embodiments, shared key 330 (used to generate the HMAC code or tag) may be utilized to secure access to (e.g., entry to an interior of and/or features of) vehicle 306 and secure the pairing of user device 302 and vehicle 306 over a first communication path (e.g., BLE link), after confirming a user has physical possession of vehicle 206. The HMAC code may be sent together with subsequent instruction messages to verify the sender and ensure integrity of the message. In some embodiments, decryption may be performed only if the HMAC code is verified.

FIG. 4 shows an illustrative device table 400, in accordance with some embodiments of the present disclosure. Device table 400 may be generated by, e.g., server 212, in response to determining a newly logged in device, e.g., user device 202, is associated with an authenticated profile. Each entry device, such as, for example, user device 202 may be assigned by processing circuitry 274 of server 212 a new token index, as indicated at token index field 412 and corresponding token index value 428. Server 212 may be configured to transmit device table 400 and the values specified therein (or transmit one or more of the values specified therein in any suitable format) to vehicle 206 (e.g., via communications circuitry 280 over network 210), for use by vehicle 206 in initiating and establishing a connection with user device 202 or user device 304. In some embodiments, server 212 may generate a new device table in response to determining any change has been made to device table 400, e.g., detecting that a new user device has logged into a particular user profile, detecting that a new key fob has been purchased, enrolling a new user device 202 or 204, etc.). Device table 400 may be utilized for user 301 to gain access to vehicle 306.

Device table 400 may comprise a plurality of fields and corresponding values, such as, for example, username field 402 and associated value 418 (e.g., user ID 308), public key field 404 and associated value 420 (e.g., public key 326 of user device 302), user device ID field 406 and associated value 422 (e.g., corresponding to user device 302), vehicle ID field 408 and associated value 424, enrolled indicator 410 and associated value 426, token index field 412 and associated token index value 428, flags field 414 and associated value 430, indicator 416 of the HMAC key and associated value 432 (e.g., shared key 330). In some embodiments, it may not be desirable to share the HMAC key indicated at 416 with server 212, e.g., for security purposes it may be desirable that only vehicle 206 and user device 202 have access to HMAC key. Additionally or alternatively, device table 400 may contain any suitable other fields and corresponding values, e.g., propulsion permissions, public key of vehicle, message identifiers, session identifiers, etc.

In some embodiments, the user device ID indicated at 424 may be generated based on public key 326 of user device 302 received from user device 302. The user device ID may additionally or alternatively be utilized in authenticating a connection between user device 302 and vehicle 306. In some embodiments, the vehicle ID indicated may be received at server 212 (e.g., during manufacturing of vehicle 306), and the vehicle ID may be utilized in initiating a connection between user device 302 and vehicle 306. For example, a beacon or advertising packet transmitted by vehicle 306 may comprise one or more of the user device ID (e.g., received by way of device table 400) or vehicle ID, and user device 302, having received the user device ID and vehicle ID, may discover vehicle 306 on the basis of such beacon or advertising packet comprising one or more of the user device ID or vehicle ID. In some embodiments, user device 202 or 204 may act as the beacon or advertising device to vehicle 306 which may scan for the user device ID indicated at 406. In some embodiments, the user device ID may be generated at server 212 and/or server 214.

In some embodiments, selectable option 318 (and/or a selectable option of "Set up Now") may be generated for display by output circuitry 222 in response to receiving data (e.g., in the form of device table 400 or in any other suitable form) and determining that user device 302 is in the enrollment process and/or is requested to be paired. In some embodiments, in response to receiving user input at input interface 226 of option 318, input interface 226 may transmit the selected pairing request or enrollment option to processing circuitry 216, which may in turn transmit such request to wireless network transceiver 238, to initiate a connection with user device 202 or 204 (e.g., over a BLE link). In some embodiments, such request may comprise the token index indicated at 412. In some embodiments, flags field 414 may indicate a model or type and/or an indicator of an age of user device 302. In some embodiments, server 212 may revoke access to a specific user or a specific device 202 may be removed from a trusted device list, e.g., device table 400, in which case vehicle 206 may receive a notification from server 212 over network 210 indicating as such, and further requests from user device 202 may be ignored.

Figure 5:
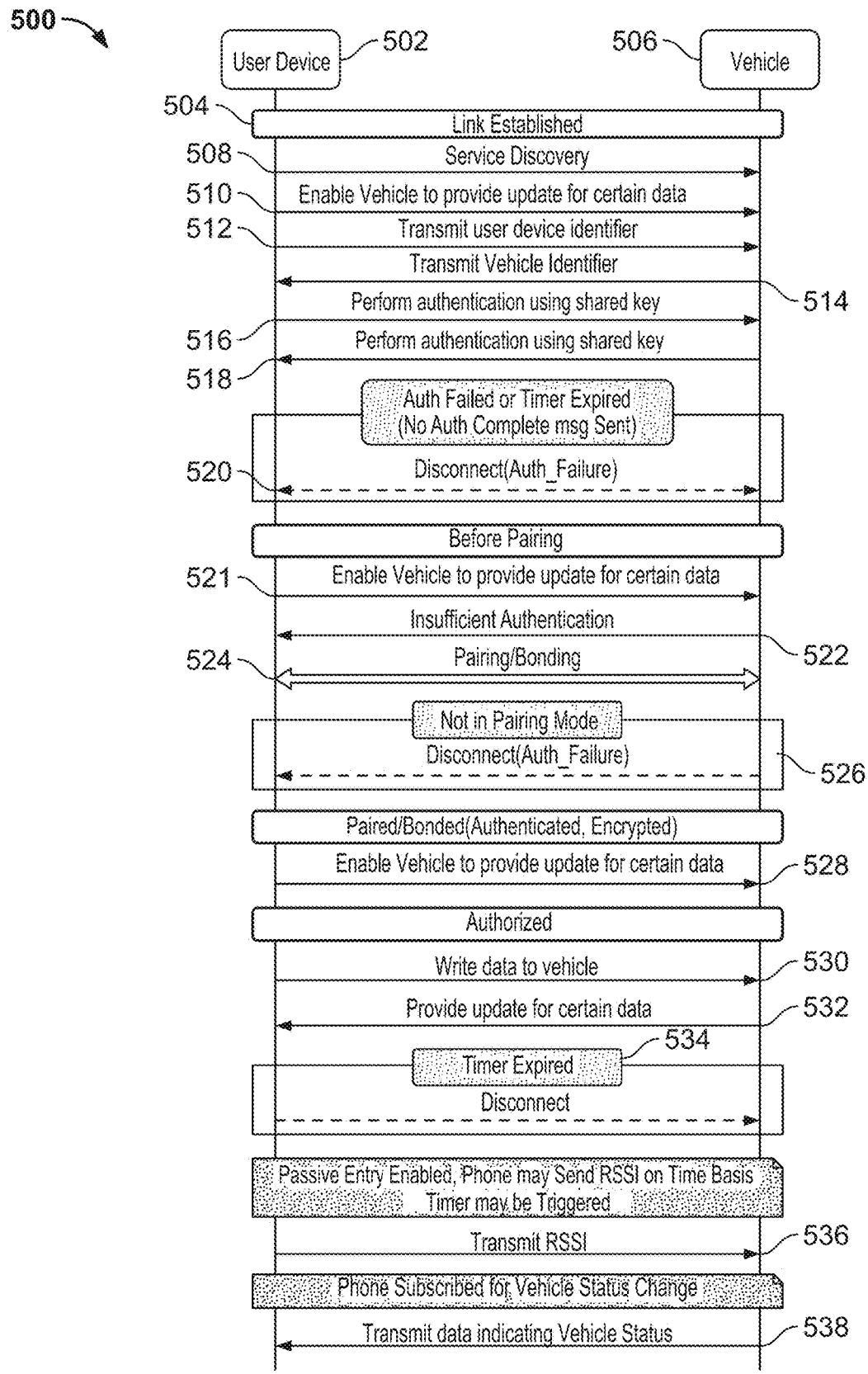
FIG. 5 shows a flowchart of illustrative process for establishing communications between a user device and a vehicle, in accordance with some embodiments of the present disclosure.

FIG. 5 shows a flowchart of illustrative process 500 for establishing communications between a user device and a vehicle, in accordance with some embodiments of the present disclosure. Process 500 may be executed at least in part by processing circuitry 216, and processing circuitry 240, and/or processing circuitry 274 and/or processing circuitry 284 of FIG. 2. Process 500 may be performed for any suitable communication technique, e.g., BLE, or any other suitable wired or wireless communication technique, or any combination thereof. In some embodiments, user device 502 may be a Generic Attribute Profile (GATT) client, and vehicle 506 may be a and GATT server, utilizing the Generic Access Profile (GAP) and GATT specifications of the BLE protocol.

At 504, a link may be established between user device 502 (which may correspond to user device 202 or user device 204 of FIG. 2) and vehicle 506 (which may correspond to vehicle 206 of FIG. 2). For example, vehicle 506 may transmit a beacon or advertising packet to user device 502 at repeated intervals, or user device 502 may transmit a beacon or advertising packet to vehicle 506 at repeated intervals.

The advertising packet which may be transmitted by vehicle 506 may comprise identifiers of services supported by vehicle 506. The advertising packet may enable vehicle 506 to discover user device 502, and/or may enable user device 502 to discover vehicle 506. At 508, user device 502 may query vehicle 506 to perform a service discovery of such services supported by vehicle 506.

At 510, user device 502 may transmit over a first communication path (e.g., a BLE link) data to enable vehicle 506 to provide updates for certain data. In some embodiments, the transmitted data may comprise a Client Characteristic Configuration Descriptor (CCCD), which may operate as a request for updates from vehicle 506 in the event of a change in a data characteristic value. In some embodiments, the data associated with the update request may be sensor readings, status information, vehicle information, or any other suitable data, or any combination thereof. As an example, step 510 may correspond to user device 502 writing a value of "ID, NONCE" in association with the CCCD, which may correspond to a request for an update to be transmitted to user device 502 if a session identifier associated with user device 502 and/or a session identifier associated with vehicle 506 changes. In some embodiments, an update provided from vehicle 506 to user device 502 may be in the form of a notification or an indication.

At 512, user device 502 may transmit a user device identifier value to vehicle 506 over the first communication path (e.g., BLE link). In some embodiments, vehicle 506 may have previously received from server 212 (e.g., over a second communication path by way of network 210) data, such as, for example, indicating or corresponding to device table 400 of FIG. 4, comprising an indication of a user device identifier and may cause the link established at 504 to be disconnected if the user device ID received at 512 is not enrolled or is not registered. For example, vehicle 506 may determine that the received user identifier is not registered if the received user device identifier does not match a user device ID 406 (e.g., specified in device table 400) received by vehicle 506 from server 212.

At 514, vehicle 506 may transmit its vehicle identifier to user device 502, e.g., over a first communication path such as, for example, a BLE link. User device 502 may have previously received the vehicle identifier from server 212 over the second communication path, e.g., the Internet such as via network 210. User device 502 may cause the link established at 504 to be disconnected if the vehicle ID received at 514 does not match the vehicle ID previously received at user device 502 from server 212.

At 516 and 518, user device 502 and vehicle 506 may respectively perform an authentication sequence, e.g., using HMAC. For example, at 516, user device 502 may calculate a HMAC code using shared key 330 (which may correspond to an HMAC key) and/or using any other suitable data. In some embodiments, user device 502 may compute HMAC code based on shared key 330 and a nonce value (e.g., a random or pseudo-random session identifier) associated with the session of user device 502, and user device 502 may transmit to vehicle 506 such calculated HMAC code (optionally along with the nonce value associated with the user device 502 session and/or any other suitable data). In some embodiments, such data may be hashed or concatenated together to generate the HMAC code, or any other suitable operation may be performed on such data to generate the HMAC code.

At 518, vehicle 506 may calculate a HMAC code using shared key 330 (which may correspond to an HMAC key) and/or using any other suitable data. In some embodiments, vehicle 506 may compute HMAC code based on shared key 330 and a nonce value associated with one or more of session of user device 502, the session of vehicle 506, and/or using an identifier of vehicle 506 and/or an identifier of user device 502, and vehicle 506 may transmit to user device 502 such calculated HMAC code (optionally along with the nonce value of the session of vehicle 506 and/or any other suitable data). In some embodiments, such data may be hashed or concatenated together to generate the HMAC code, or any other suitable operation may be performed on such data to generate the HMAC code. Each of user device 502 and vehicle 506 may establish the communication channel between user device 502 and vehicle 506 by verifying that the received HMAC code matches a HMAC code computed by vehicle 506 (in response to receiving the transmission at 516) and user device 502 (in response to receiving the transmission at 518). In some embodiments, after 520, an authentication timer may be stopped (e.g., having been started at 504, and set to any suitable value, such as, for example, 5 seconds).

At 520, user device 502 and/or vehicle 506 may determine whether the authentication sequence has failed. For example, if there is mismatch between the received HMAC code and the computed HMAC code at 516 or 518, and/or an authentication timer expired, the link over the first communication path (e.g., a BLE link) between user device 502 and vehicle 506 may be disconnected. In some embodiments, an authentication complete message may be sent if authentication is successful, and the absence of such message may indicate that authentication failed. On the other hand, if no such mismatch is present (and/or the authentication timer has not expired and/or the authentication complete message has been received), the BLE link over the first communication path (e.g., a BLE link) between device 502 and vehicle 506 may persist, and user device 502 may be permitted to instruct vehicle 506 to perform various functions over the first communication path.

At 521 (e.g., before pairing) user device 502 may transmit over the first communication path (e.g., BLE link) a request to enable vehicle 506 to provide updates for certain data. 521 may be implemented in a similar manner as 510. In some embodiments, at 521, user device 502 may write an Active_CMD value to the CCCD, which may operate to enable user device 502 to read or write data from or to vehicle 506, send commands to configure settings of vehicle 502, be notified if settings of vehicle 502 change, instruct vehicle 506 to perform a task, and/or obtain any suitable data from vehicle 502. In some embodiments, at 522, vehicle 506 may indicate whether authentication is insufficient in connection with 521.

At 524, pairing or bonding may occur between user device 502 and vehicle 506. Pairing may be understood as a temporary connection state that may not continue across subsequent connections, whereas bonding may be understood as a connection state that continues across subsequent connections, e.g., the pairing step may be skipped subsequent to bonding being established. In some embodiments, the pairing or bonding request may be permitted based on user device 502 being enrolled or registered. On the other hand, if enrollment is not enabled, the pairing or bonding request may be rejected. At 526, upon determining one or more of user device 502 or vehicle 506 is not in pairing mode, the connection over the first communication path may be disconnected. In some embodiments, user device 502 may request to be notified by vehicle 506 in the event of no pairing or bonding being detected.

At 528, user device 502, having been authenticated, and paired or bonded with vehicle 506, may transmit over the first communication path (e.g., BLE link) a request for updates from vehicle 506 in the event of a change in a data characteristic value, which may be performed in a similar manner to 521 and/or 510. In some embodiments, such request, or any other suitable data, may be encrypted over the communication link. At 530, user device 502, having been authorized to receive updates from vehicle 506 and/or write data to vehicle 506, may be configured to write data to vehicle 506 regarding the status of user device 502 and/or may write any other suitable data or request any suitable data or instruct any suitable task to be performed. At 532, user device 502 may receive a notification or indication acknowledging receipt of such data from vehicle 506 or otherwise provide updates to user device 502.

At 534, the connection over the first communication path between vehicle 506 and user device 502 may be disconnected if user device 502 and/or vehicle 506 determines that a timer has expired. In some embodiments, such as, for example, if the timer has not expired, passive entry may be enabled, such as to automatically unlock one or more doors or a hatch or trunk of vehicle 506, and/or any other suitable tasks may be instructed to be performed. At 536, user device 502 may transmit a Received Signal Strength Indicator (RSSI) value (or any other suitable wireless signal data or wireless signal metrics) to vehicle 506, from which vehicle 506 may determine a range of user device 502 from vehicle 506, which may impact the services of vehicle 506 that user device 502 can access. At 538, a vehicle status may be provided to user device 502, e.g., in response to determining user device 502 is subscribed to notifications regarding such information and/or corresponds to a smartphone. In some embodiments, if user device 502 corresponds to a key fob, the vehicle status may not be transmitted to the key fob user device.

Figure 6:
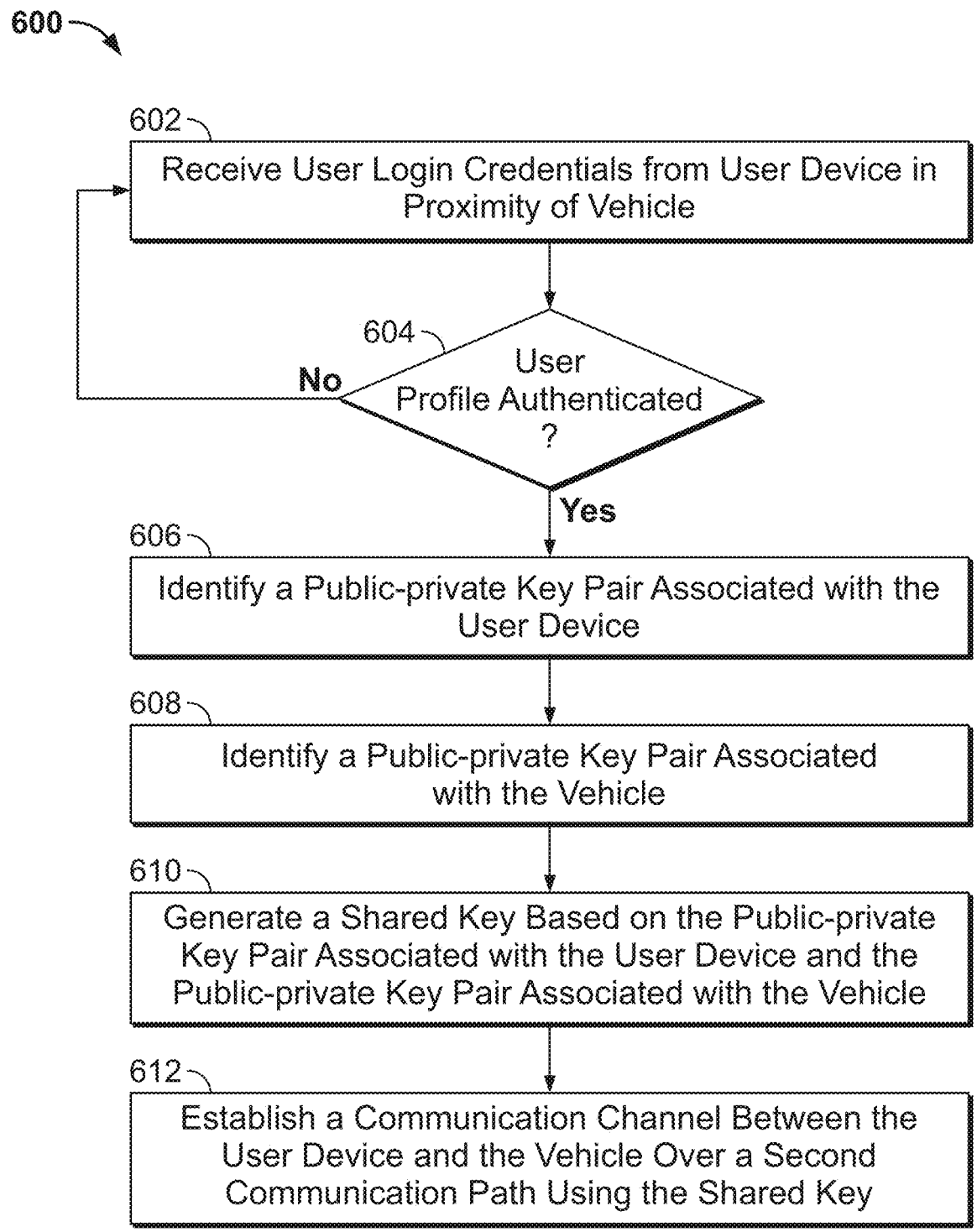
FIG. 6 shows a flowchart of illustrative process for establishing communications between a user device and a vehicle, in accordance with some embodiments of the present disclosure.

FIG. 6 shows a flowchart of illustrative process 600 for establishing communications between a user device and a vehicle, in accordance with some embodiments of the present disclosure. Process 600 may be executed at least in part by processing circuitry 216, and processing circuitry 240 and/or processing circuitry 262, and/or processing circuitry 274 and/or processing circuitry 284.

At 602, communications circuitry 280 of server 212 may receive login credentials input by user 301 at user device 302 over network 310. In some embodiments, two-factor authentication may be utilized (e.g., server 112 may send an SMS or email message to, or call the number associated with, the user device associated with the credentials).

At 604, processing circuitry 274 of server 212 may determine whether a user profile associated with the received credentials is authenticated. For example, processing circuitry 274 may compare the received credentials to login credentials stored in memory 278 and determine whether there is a match. In response to authenticating the user profile, processing may proceed to 606. Otherwise, a message may be transmitted to user device 302 over network 310 indicating the login was not successful, and further login attempts may be received.

At 606, processing circuitry 274 of server 212 may identify a public-private key pair associated with user device 302. For example, processing circuitry 240 of user device 302 may generate public key 326 and associated private key 328, and transmit public key 326 to server 212 over network 310. In some embodiments, private key 328 is not transmitted to server 212 by user device 302 and is kept secret and stored at user device 302. Any suitable any suitable cryptographic algorithm or technique may be used to generate the public-private key pair (e.g., RSA, ECC, ECDSA asymmetric algorithms). In some embodiments, key management server 214 may generate one or more of public key 326 and associated private key 328.

At 608, processing circuitry 274 of server 212 may identify a public-private key pair associated with vehicle 306. For example, processing circuitry 216 of vehicle 306 may generate public key 322 and associated private key 324, and transmit public key 322 to server 212 over network 310. In some embodiments, private key 324 is not transmitted to server 212 by vehicle 306 and may be kept secret and stored at vehicle 306. Any suitable any suitable cryptographic algorithm or technique may be used to generate the public-private key pair (e.g., RSA, ECC, ECDSA asymmetric algorithms). In some embodiments, key management server 214 may generate one or more of public key 322 and associated private key 324.

At 610, each of processing circuitry 216 of vehicle 306 and processing circuitry 262 of user device 204 may generate shared key 330. In some embodiments, the ECDH key exchange protocol may be employed to generate shared key 330.

At 612, based on shared key 330, a communication channel between user device 202 and vehicle 206 over a second communication path (e.g., BLE link, NFC, etc.) using shared key 330. For example, shared key 330 may be used as a symmetric key in the HMAC cryptographic technique to verify (at vehicle 306 or user device 302)

messages received over the second communication path as having been received from the other of vehicle 306 or user device 302.

Figure 7:
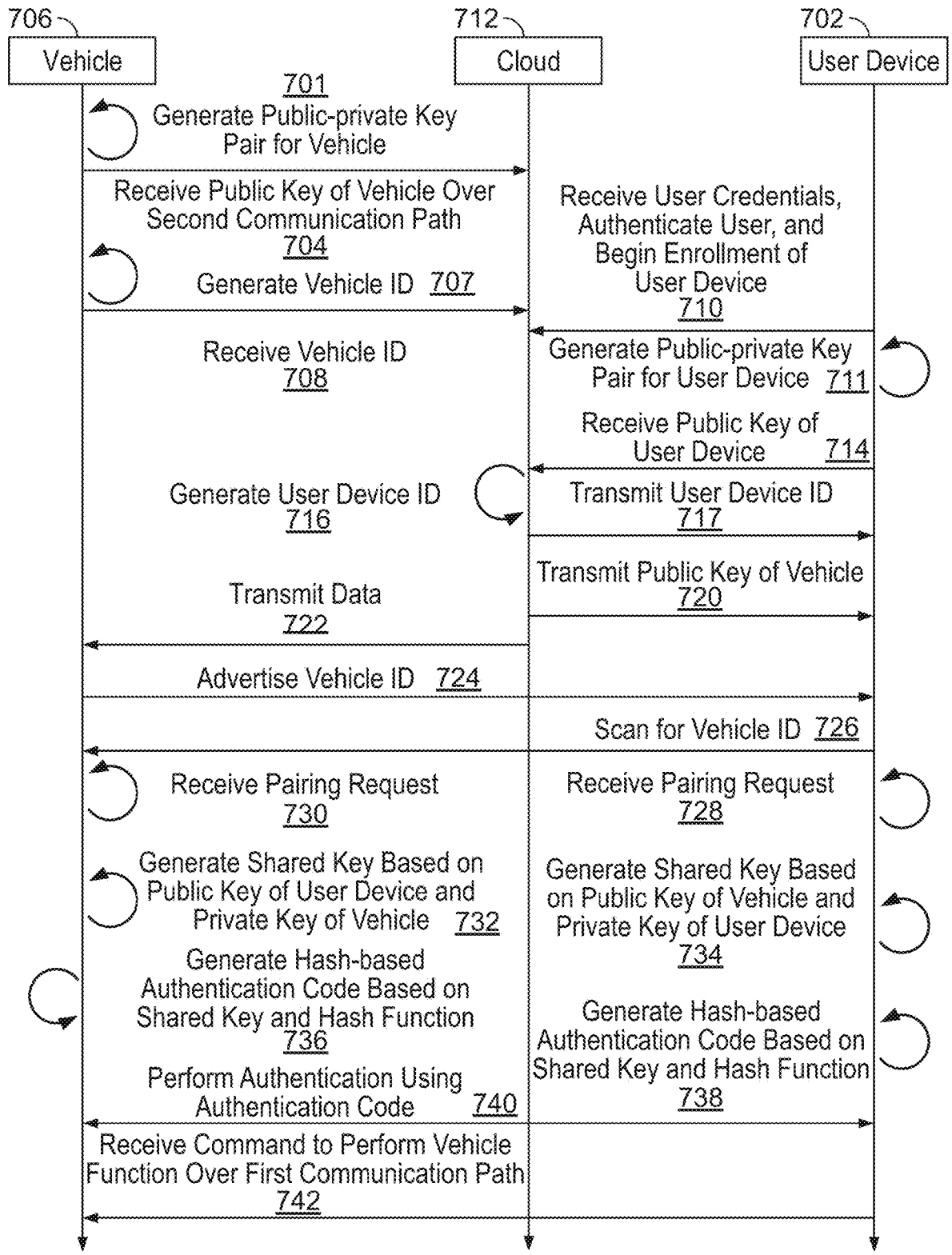
FIG. 7 shows a flowchart of illustrative process for establishing communications between a user device and a vehicle, in accordance with some embodiments of the present disclosure.

FIG. 7 shows a flowchart of illustrative process 700 for establishing communications between a user device and a vehicle, in accordance with some embodiments of the present disclosure. In process 700, vehicle 706 may correspond to vehicle 206, cloud 712 may correspond to one or more servers 212 and/or key management server 214, and user device 702 may correspond to user device 202 or user device 204.

At 701, processing circuitry 216 of vehicle 206 may generate a public-private key pair for vehicle 206. For example, processing circuitry 216 of vehicle 306 may generate, at any suitable time (e.g., during manufacturing of vehicle 206) public key 322 and associated private key 324, and transmit public key 322 to server 212 over network 310.

At 704, communications circuitry 280 of server 212 may receive public key 322 of vehicle 306 over network 310, and public key 322 of vehicle 306 may be stored in memory 278 of server 212.

At 707, processing circuitry 216 of vehicle 206 may generate a vehicle identifier indicated at 424 for vehicle 206. Such vehicle identifier indicated at 424 may be generated at any suitable time (e.g., during manufacturing of vehicle 206). At 708, server 212 may receive the vehicle ID from vehicle 206 over network 310.

At 710, server 212 may receive login credentials 308, 309 from user device 302. Based on the received credentials, server 212 may authenticate a user profile associated with user 301 and user device 302, and begin an enrollment process of user device 302. In some embodiments, the user profile of user 301 may be created by a manufacturer of vehicle 306 when user 301 purchases vehicle 306, and server 212 may be associated with the manufacturer of vehicle 306. The enrollment process may be configured to link user device 302 to such user account.

At 711, user device 702 may generate a public-private key pair for user device 702. For example, processing circuitry 240 of user device 202 may generate, at any suitable time (e.g., after the user profile is authenticated) public key 326 and associated private key 328, and transmit public key 326 to server 212 over network 310.

At 714, communications circuitry 280 of server 212 may receive public key 326 of user device 302 over network 310, and public key 326 of user device 302 may be stored in memory 278 of server 212.

At 716, processing circuity 274 of server 212 may generate a user device identifier indicated at 422 of device table 400. In some embodiments, the generation of the user device identifier may be performed based on public key 326 of user device 302.

At 717, communications circuitry 280 of server 212 may transmit the user device identifier to user device 302 over network 310. At 720, communications circuitry 280 of server 212 may transmit the vehicle device identifier to user device 302 over network 310. At 722, communications circuitry 280 of server 212 may generate and transmit device table 400 to vehicle 306 over network 310. In some embodiments, each time a field of device table 400 is modified or added, an updated device table 400 may be transmitted to vehicle 306 over network 310.

At 724, vehicle 306 may transmit a beacon or advertising packet advertising the vehicle identifier, e.g., over a BLE link, utilizing the Generic Access Profile (GAP) specification of the BLE protocol. Such vehicle identifier may be used to initiate a connection between user device 302 and vehicle 306. In some embodiments, wireless network transceiver 238 of vehicle 206 may broadcast a wireless signal from an antenna to enable the wireless signal to be detected by an antenna of user device 202 or any other suitable receiver. The wireless signal may comprise an identifier of vehicle 206, e.g., the wireless signal may be modulated to comprise identifying information such as a vehicle access system identifier (e.g., UUID 32 bytes long) of vehicle 206. In some embodiments, such beacon or advertising packet is only transmitted by vehicle 306 if the user profile of user 301 and user device 302 is successfully authenticated.

At 726, user device 302 may scan and listen for the vehicle identifier. User device 302 may have stored the vehicle identifier in memory 244, and may compare the scanned identifier to the stored value. In some embodiments, the advertising packet may be directed at user device 302 by including an indication of the user device ID. In some embodiments, the advertising packet may indicate UUIDs of one or more services supported by vehicle 306 over the first communication path.

At 728 and 730, user device 302 and vehicle 306 may respectively receive a pairing request. For example, input circuitry 224 of vehicle 306 may receive selection of option 318, and/or I/O circuitry 250 of user device 202 may receive selection of option 314 or 316. In some embodiments, pairing and/or enrollment may begin automatically in response to the user profile being authenticated. In some embodiments, when a user is logged in, he or she may be notified at user device 302 to enroll user device 302.

At 732 and 734, each of processing circuitry 216 of vehicle 306 and processing circuitry 262 of user device 204 may generate shared key 330. In some embodiments, the ECDH key exchange protocol may be employed to generate shared key 330. For example, shared key 330 may be generated by vehicle 306 based on private key 324 of vehicle 306 and public key 326 of user device 302 (e.g., received by way of data received in the form of device table 400, or received in any other suitable form), and shared key 330 may be generated by user device 302 based on private key 328 of user device 302 and public key 322 of vehicle 306 received from server 212 over network 210.

At 740, each of processing circuitry 216 of vehicle 306 and processing circuitry 262 of user device 204 may perform an authentication sequence based on the HMAC cryptographic technique. For example, in the HMAC technique, shared key 330 may be used as the HMAC key, and the HMAC key may be hashed with a message to be sent (e.g., including a nonce value as shown at 516, 518) using a hashing function to generate a HMAC code. The HMAC code may be transmitted from vehicle 306 to user device 302 and from user device 302 to vehicle 306, and the HMAC code may be computed at the receiving device and compared to the received HMAC code to ensure authenticity and integrity of the message and establish a communication channel over a communication path associated with a short-range mode of communication (e.g., BLE, NFC, etc.).

At 742, once authentication is complete, user device 302 may initiate commands, e.g., together with the HMAC code, to perform functions associated with vehicle 306 (e.g., lock or unlock doors, start or turn off vehicle 306, play media at vehicle 306) over the short-range mode of communication. In some embodiments, once user device 302 is enrolled with respect to vehicle 306 (e.g., and is indicated as enrolled at server 212), user device 302 and vehicle 306 may be bonded and subsequent sessions may not require the user to log in again.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
  a vehicle configured to communicate with a user device over a first communication path;
  a server configured to:
    communicate with the vehicle over a second communication path;
    communicate with the user device over a third communication path;
    store, in relation to an authenticated user profile, credentials for accessing the authenticated user profile and information indicating an association between the vehicle and the authenticated user profile based on the user device receiving input to enroll the user device with the vehicle indicated in the authenticated user profile;
    store, in relation to the authenticated user profile, information indicating an association between the user device and the authenticated user profile that is associated with the vehicle based on:
      receiving login credentials from the user device;
      comparing the received login credentials to the stored credentials; and
      based on the comparing, determining the received login credentials match the stored credentials for the authenticated user profile associated with the vehicle;
    identify a public-private key pair associated with the user device based on a public key of the public-private key pair associated with the user device received from the user device over the third communication path, wherein the public-private key pair associated with the user device is generated at the user device based on the received input and the server storing the information indicating the association between the user device with the authenticated user profile; and
    identify a public-private key pair associated with the vehicle based on a public key of the public-private key pair associated with the vehicle received from the vehicle over the second communication path, wherein the public-private key pair associated with the vehicle is generated at the vehicle; and
  processing circuitry configured to:
    generate a shared key based on the public-private key pair associated with the user device and the public-private key pair associated with the vehicle; and
    establish a communication channel between the user device and the vehicle over the first communication path using the shared key.

2. The system of claim 1, wherein the processing circuitry is configured to establish the communication channel between the user device and the vehicle over the first communication path using the shared key by:
  generating an authentication code based on the shared key and a hash function; and
  authenticating a message received over the communication channel using the authentication code.

3. The system of claim 1, wherein:
  the processing circuitry is configured to generate the shared key based on the public-private key pair associated with the user device and the public-private key pair associated with the vehicle by:
    receiving, at the vehicle from the server, the public key of the public-private key pair associated with the user device; and
    generating, at the vehicle, the shared key based on the received public key of the public-private key pair associated with the user device and based on a private key of the public-private key pair associated with the vehicle.

4. The system of claim 1, wherein:
  the processing circuitry is further configured to broadcast a vehicle identifier, and
  the vehicle identifier is used to initiate a connection between the user device and the vehicle over the first communication path.

5. The system of claim 4, wherein the processing circuitry is further configured to:
  generate an authentication code based on the shared key, a hash function, and the vehicle identifier; and
  establish the communication channel between the user device and the vehicle over the first communication path using the shared key by authenticating a message received over the communication channel using the authentication code.

6. The system of claim 1, wherein:
  the server is further configured to generate a user device identifier based on the public key of the public-private key pair associated with the user device; and
  the processing circuitry is further configured to:
    generate an authentication code based on the shared key, a hash function and the user device identifier; and
    establish the communication channel between the user device and the vehicle over the first communication path using the shared key by authenticating a message received over the communication channel using the authentication code.

7. The system of claim 1, wherein the shared key is used to authenticate messages between the user device and the vehicle over the first communication path.

8. The system of claim 1, wherein:
  the first communication path is over a Bluetooth Low Energy (BLE) connection and each of the second communication path and the third communication path is over the Internet; and
  the user device is a key fob or a mobile device.

9. The system of claim 1, wherein:
  the server is further configured to:
    generate data associated with the authenticated user profile, wherein the data comprises a user device identifier, and a username associated with the authenticated user profile; and
    transmit the data to the vehicle; and
  the processing circuitry is further configured to initiate a connection between the user device and the vehicle over the first communication path based on the data.

10. A vehicle configured to communicate with a user device over a first communication path, the vehicle comprising:

memory; and processing circuitry configured to:
receive an indication, from a server over a second communication path, that a user device is associated with an authenticated user profile that is associated with the vehicle, wherein the server is configured to:
store, in relation to an authenticated user profile, credentials for accessing the authenticated user profile and information indicating an association between the vehicle and the authenticated user profile based on the user device receiving input to enroll the user device with the vehicle indicated in the authenticated user profile;
store, in relation to the authenticated user profile, information indicating the association between the user device and the authenticated user profile that is associated with the vehicle based on:
receiving login credentials from the user device;
comparing the received login credentials to the stored credentials; and
based on the comparing, determining the received login credentials match the stored credentials for the authenticated user profile associated with the vehicle;
receive, over the second communication path, a public key of a public-private key pair associated with the user device, wherein the public key of the public-private key pair associated with the user device is generated at the user device based on the received input and the server storing the information indicating the association between the user device with the authenticated user profile and is received by the server from the user device over a third communication path;
identify a public-private key pair associated with the vehicle based on a public key of the public-private key pair associated with the vehicle, wherein the processing circuitry generates the public-private key pair associated with the vehicle;
store in the memory the public-private key pair associated with the vehicle;
transmit the public key of the public-private key pair associated with the vehicle to the server over the second communication path;
generate a shared key based on the public key associated with the user device and the public-private key pair associated with the vehicle; and
establish a communication channel between the user device and the vehicle over the first communication path using the shared key.

11. The vehicle of claim 10, wherein the processing circuitry is configured to establish the communication channel between the user device and the vehicle over the first communication path using the shared key by:
generating an authentication code based on the shared key and a hash function; and
authenticating a message received over the communication channel using the authentication code.

12. The vehicle of claim 10, wherein:
the processing circuitry is configured to generate the shared key based on the public-private key pair associated with the user device and the public-private key pair associated with the vehicle by generating, at the vehicle, the shared key based on the received public key of the public-private key pair associated with the user device and based on a private key of the public-private key pair associated with the vehicle.

13. The vehicle of claim 10, wherein:
the processing circuitry is further configured to broadcast a vehicle identifier, and
the vehicle identifier is used to initiate a connection between the user device and the vehicle over the first communication path.

14. The vehicle of claim 13, wherein the processing circuitry is further configured to:
generate an authentication code based on the shared key, a hash function, and the vehicle identifier; and
establish the communication channel between the user device and the vehicle over the first communication path using the shared key by authenticating a message received over the communication channel using the authentication code.

15. The vehicle of claim 10, wherein:
the processing circuitry is configured to:
receive a user device identifier from the server, wherein the user device identifier is generated based on the public key of the public-private key pair associated with the user device;
generate an authentication code based on the shared key, a hash function and the user device identifier; and
establish the communication channel between the user device and the vehicle over the first communication path using the shared key by authenticating a message received over the communication channel using the authentication code.

16. The vehicle of claim 10, wherein the shared key is used to authenticate messages between the user device and the vehicle over the first communication path.

17. The vehicle of claim 10, wherein:
the first communication path is over a Bluetooth Low Energy (BLE) connection and each of the second communication path and the third communication path is over the Internet; and
the user device is a key fob or a mobile device.

18. The vehicle of claim 10, wherein the processing circuitry is further configured to:
receive, from the server, data associated with the authenticated user profile, wherein the data comprises a user device identifier, and a username associated with the authenticated user profile; and
initiate a connection between the user device and the vehicle over the first communication path based on the data.

19. A method comprising:
communicating, by a server, with a vehicle over a second communication path, wherein the vehicle is configured to communicate with a user device over a first communication path, and wherein the server is configured to communicate with the user device over a third communication path;
storing, by the server and in relation to an authenticated user profile, credentials for accessing the authenticated user profile and information indicating an association between the vehicle and the authenticated user profile based on the user device receiving input to enroll the user device with the vehicle indicated in the authenticated user profile;
storing, by the server and in relation to the authenticated user profile, information indicating an association between the user device and the authenticated user profile that is associated with the vehicle based on:
receiving login credentials from the user device;

comparing the received login credentials to the stored credentials; and based on the comparing, determining the received login credentials match the stored credentials for the authenticated user profile associated with the vehicle;

identifying, by the server, a public-private key pair associated with the vehicle based on a public key of the public-private key pair associated with the vehicle received from the vehicle over the second communication path, wherein the public-private key pair associated with the vehicle is generated at the vehicle;

identifying, by the server, a public-private key pair associated with the user device based on a public key of the public-private key pair associated with the user device received from the user device over the third communication path, wherein the public-private key pair associated with the user device is generated at the user device based on the received input and the server storing the information indicating the association between the user device with the authenticated user profile;

generating, by processing circuitry, a shared key based on the public-private key pair associated with the user device and the public-private key pair associated with the vehicle; and establishing, by the processing circuitry, a communication channel between the user device and the vehicle over the first communication path using the shared key.

* * * * *